United States Patent Office 2,945,130
Patented July 12, 1960

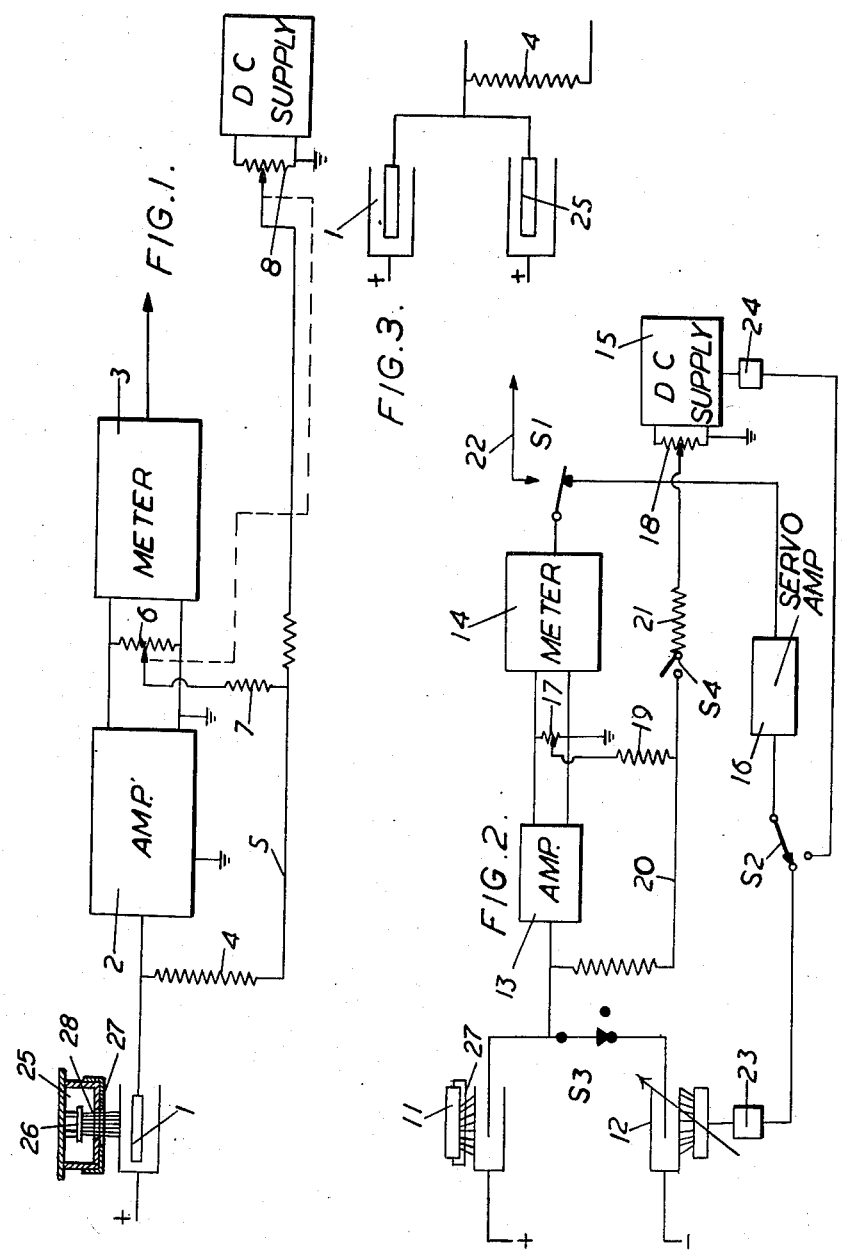
Inventors,
WILLIE E. THOMPSON
LAURENCE E. TAYLOR

2,945,130

THICKNESS MEASURING GAUGES USING RADIOACTIVE MATERIAL

Willie Ellis Thompson and Laurence E. Taylor, Rayleigh, England, assignors to Ekco Electronics Limited, Southend-on-Sea, England Filed Dec. 29, 1954, Ser. No. 478,306

Claims priority, application Great Britain Jan. 13, 1954

13 Claims. (Cl. 250—83.6)

This invention relates to the measuring or controlling of the thickness of material by gauges which operate on the principle of indicating any change in beta ray absorption by the material under test. Such apparatus comprises a radioactive isotope as a source of beta radiation and an ionisation chamber in the output circuit of which is an amplifier and a utilisation circuit for giving a meter reading or providing a current or voltage which is used to correct any slight variations in thickness.

An apparatus of this kind is described in an article entitled "Beta-Particle and Gamma-Ray Thickness Gauges" by M. G. Hammett and H. W. Finch in a supplement entitled "Electronics in Industry" to the Journal "Electronic Engineering" dated November 1952.

There are two well known arrangements for connecting the ionisation chamber of a gauge, used for measuring the absorption of a material therein, with a utilisation circuit (the utilisation circuit comprises a meter circuit and/or a circuit for operating servo mechanism). One arrangement utilises a device comprising a single radioactive source of beta radiation and ionisation chamber in a circuit in which the output voltage from the chamber is opposed to an applied steady voltage so that when a given absorber is in the device a predetermined reading (usually a null reading) is given by the utilisation circuit. As is well known, an ionisation chamber will produce an output voltage across a load resistance connected across its electrodes, when a polarising voltage is applied to one electrode. The output voltage is a function of the mass of the absorber between the source of ionisation and the chamber and is practically independent of the potentiometer voltage when this is above a certain value, the polarity of the voltage across the load resistance being the same as that of the polarising voltage. In the other arrangement a second device comprising a radioactive source of beta radiation and ionisation chamber is used as a standard and connected so that when the absorption of the two devices is the same, the outputs of the two ionisation chambers, which are opposed, balance out to give the null reading in the utilisation circuit.

For ease in reference we shall refer to the circuit in which two voltages are opposed (i.e. in one case from the ionisation chamber and the applied steady voltage supply and in the other case from the two ionisation chambers) as a bridge circuit, though it need not in fact be a true bridge circuit.

In such devices the radioactive source is subject to decay and contamination so that the output from the ionisation chamber, other factors being constant, falls with time. It has been found necessary to provide means for adjusting the bridge balance to maintain true indication. As a result of both these variations the output from the bridge is reduced and it is necessary to compensate in some way so that the indication current may be maintained at the level required to give true readings in the indicating meter and/or in the control signal for the control mechanism.

An object of the present invention is automatic means for effecting such compensation.

We have observed that the curve connecting the chamber output current (and also differential output) plotted to a logarithmic base as ordinates against mass per unit area of absorber as abscissae is, for mass per unit area greater than a pre-ascertained minimum value, substantially a straight line. The curve connecting activity of the ray source plotted to a logarithmic base with time as abscissae is also substantially a straight line.

A feature of the present invention is a means or method of compensating for effects of decay and/or contamination, as aforesaid by ganging (i.e. simultaneously and jointly operating) the controls of the bridge adjusting means with a sensitivity control of the amplifier.

In such an arrangement according to another feature of the invention means are provided to ensure that the absorption does not fall below that representing the aforesaid pre-ascertained minimum value of mass per unit area.

A specific application of the invention is in a gauge for measuring or controlling the thickness of a coating or coatings, of material on a moving sheet. In this application it is convenient to pass the sheet through two devices as aforesaid with output circuits connected in opposition (bridge connection) so as to produce a control or indicating current which corresponds to the difference in current from each device. The devices may be separated along the sheet by a distance of several feet and between them a surface coating is applied to the sheet. The resultant current is used to operate a meter or to provide a control current which governs the deposit of material on the sheet. The device situated about the sheet prior to the coating operation is called the standard device and has means for varying the distance of its radioactive source from its ionisation chamber and in the initial setting of the device, adjustment is made so that with the desired thickness of coating on the sheet the control or indicating current is zero. When the coating machine is then set into operation any variation in the thickness of the coating deposited on the moving sheet produces an indication in the meter or a control current to adjust the deposit to the predetermined thickness. This is most conveniently effected by causing the control current to increase or decrease the rate of travel of the sheet, or by decreasing or increasing roll spacing or pressure etc.

It has been found that the radioactive source and/or ionisation chamber of the device which is not being used as the standard is often more subject to contamination than is that of the standard device. Unless this be corrected a wrong indication or control current is produced.

A further feature of the invention is, in an arrangement just described, a method of avoiding unbalance (due to contamination) in the output or utilisation circuit of two such devices one of which devices is used as a standard, in which a current derived from the devices differentially, is amplified and used to operate a meter or control mechanism and is characterised by means wherein on such unbalance occurring a control current or voltage is derived and used to correct or reduce the effect of such unbalance.

Preferably in such an arrangement the control current or voltage is used to operate a servo mechanism effecting an adjustment in the distance between the radioactive source and the ionisation chamber in one device of the pair or by otherwise altering the absorption between the source and chamber.

In order that the invention may be more readily understood a description of one form thereof will now be given with reference to the accompanying drawings in which Figure 1 is a block schematic of a single device circuit arrangement whilst Figure 2 shows how the arrangement of Figure 1 may be modified by using a standard device as well as a measuring device, whilst Figure 3 illustrates a detail of modification for Figure 1. In Figure 1 the output electrode 1 of the ionisation chamber of the measuring device is connected to an amplifier 2 from which leads are taken to a meter indicated as a rectangle 3. The voltage from the electrode 1 is opposed by a voltage across a resistance 4 in a lead 5. A potentiometer 6 is connected across the amplifier output and constitutes a sensitivity control for the amplifier, providing a negative feedback through a resistance 7 and the lead 5. A potentiometer 8 is connected in any suitable manner to a source of D.C. (direct current) so as to receive a steady voltage across its terminals. The moving arm of the potentiometer 8 is connected through a resistance to the lead 5. The moving arms of the potentiometers 6 and 8 are connected together as indicated by the broken lines, so as to move in unison. It will be observed that any decay or contamination in the radioactive source or ionisation chamber would cause a reduction in the output current from the chamber. If all that were done to correct this was to reduce the applied voltage in the lead 5 from the source of steady voltage 8, the amplifier would no longer deliver optimum output signal strength to give the requisite meter reading and/or servo control signal. However since the reduction in voltage fed back from potentiometer 8 must be accompanied by a reduction in the negative feedback through the lead 5 from potentiometer 6, the said signal strength is maintained at optimum value.

If the circuit as shown were used with permanent absorbers which absorb less radiation than is required to permit operation in the straight part of the above described curve connecting ionisation chamber output and mass per unit area of absorber, the results would be incorrect.

To overcome this we employ, between source and chamber, a permanent absorber which has the said preascertained minimum value of mass per unit area, to ensure operation on the straight part of the curve. For example we have found that we may use a polythene cover for the ionisation chamber, this cover constituting a permanent absorber of say 40 milligrams per square centimetre. In Fig. 1, an ionisation chamber 25, having a radio-active source 26, includes a polyethylene cover 27 which extends across emission window 28, and serves as a permanent absorber for some of the rays.

When the device is set up, say, for instance, in a machine in which the thickness of a web of paper is to be controlled, the following procedure would be adopted. The meter circuit is adjusted to give a true zero reading in the meter. The potentiometers 6 and 8 are operated to make the output current from the amplifier compatible with the range of the meter. This adjustment of the potentiometers automatically compensates for any effects due to decay or contamination in the radioactive source and/or ionisation chamber.

In the specific application of the invention above referred to, where a standard device is used in addition to the measuring device, the circuit may be as shown in Figure 2.

In this arrangement illustrated 11 is a measuring device through which material to be measured is passed. 12 is a standard device with means for readily adjusting the distance between its radioactive source and ionisation chamber. 13 is an amplifier, 14 a meter, 15 a source of D.C. supply and 16 an amplifier for a servo mechanism. A potentiometer 17 operates as sensitivity control for amplifier 13 and a potentiometer 18 serves for correcting faults due to contamination in either of the devices. The tapping of potentiometer 17 is connected through a resistance 19 to a lead 20 constituting a negative feedback connection to the amplifier 13. The tapping of potentiometer 18 is adapted to be connected through a resistance 21 and switch S4 to the lead 20. The circuits are under control of switches S1, S2, S3 and S4.

The arrangement is used for measuring the thickness of coating upon a sheet and the method of operation is as follows:

The uncoated sheet is measured by device 12, the coated sheet being measured by device 11 and therefore there will be a difference voltage from these devices proportional to the thickness of the coating applied. This difference voltage is balanced out by means of the D.C. supply 15 and when the coating thickness is correct the meter will read zero.

During normal running of the machine under control, a control current will be fed through switch S1 to a lead 22 to maintain substantially constant the thickness being measured. At the time it is desired to make the correction, both heads are removed from the sheet under measurement and the switches are moved to the position shown. However when the switches are in the position shown, the device output, i.e. control current, is fed through S1 to the servo amplifier 16 which delivers the amplified control current to operate a motor 23, arranged to adjust the spacing between radioactive source and ionisation chamber in device 12 so as to effect a balance in the outputs of the two devices. For example if there has been contamination in device 11 such that the current from its ionisation chamber is reduced, the motor 23 would cause an increase in the said spacing, to restore balance. It is now necessary to adjust the D.C. supply at 15 to compensate for decay and contamination. Since the output from the two devices 11 and 12 has now been balanced, either one may be regarded as standard for the purpose of adjusting the D.C. supply 15 and the ganged control 17 to adjust the sensitivity. Therefore switches S2, S3 and S4 are moved to their alternative contacts, the circuit of motor 23 is broken and the operating circuit of a motor 24 is closed. This motor controls the actuation of the movable arms of potentiometers 17 and 18 so that these move in unison i.e. they are ganged. In this position S4 is closed and passes to lead 20 a predetermined steady voltage against which the output from 11 is to be compared for standardisation. Any unbalance will cause a control current to flow in servo amplifier 16 to operate motor 24 and adjust the sensitivity of 13 accordingly, the arrangement in this position acting similarly to that of Figure 1.

Sometimes it is desired to use two devices and to correct for any unbalance electromechanically instead of electrically as in Figure 2. Figure 3 shows how the arrangement of Figure 1 may be so adapted. The connections not shown are similar to those of Figure 1. In this case the outputs from a standard device 25 and the measuring device 1 are in opposition so that a differential voltage appears across the devices which has to be balanced by a voltage developed across resistance 4 so as to give zero signal to the amplifier and a null reading in the meter. In checking the equipment from time to time we must allow for any decay or contamination which has occurred. To do this, the standard device is switched off and if decay or contamination has occurred in the other, there will be unbalance due to the remaining chamber output being below a reference voltage injected into the feedback line (this reference voltage having been obtained by comparing it with the voltage obtained from the chamber when clean), which will produce a control current out of the device which will drive the standardisation servo amplifier, the output of which has been switched already to the motor driving the decay/contamination control potentiometer. In this way, the contamination can be corrected for. In order to maintain amplifier sensitivity correct, due to variation in the decay/contamination control setting as we have explained above, the sensitivity control is ganged directly to the decay/contamination control.

The effect of contamination may be periodically reduced by replacing the aforementioned polythene cover with a new (and therefoee uncontaminated) cover. When this is done the standard voltage will have to be increased and the sensitivity of the amplifier correspondingly reduced. The arrangement of Figure 2 will also operate to carry out this correction.

The above switching operations are preferably automatic and time controlled—for example they may be carried out at thirty minute intervals, this time being fixed and obtained from a dekatron timing unit which is built into the equipment. It will be observed that the servo signal serves to control the thickness of the deposit on the sheet during normal operation but that when the automatic standardising switch is operated the servo signal is used in one position of the switch contacts to control the ganged potentiometers 6 and 8, and in another position of the switch contacts to adjust the distance between the ionisation chamber and radioactive source of device 12.

What we claim is:

1. In a beta ray thickness measuring gauge, a source of beta ray, an ionisation chamber associated with said ray source, a source of standard voltage, means for impressing the output from the ionisation chamber and the standard voltage on the input of an amplifier to produce a difference signal, a utilisation circuit coupled to said amplifier, and means for jointly varying the standard voltage and the sensitivity of the amplifier to compensate for effects of decay and contamination associated with the radioactive source.

2. A beta ray thickness measuring gauge in accordance with claim 1, wherein the means for jointly varying the standard voltage and the sensitivity of the amplifier comprise a potentiometer adapted to vary the said standard voltage and a potentiometer controlling the degree of negative feedback in the amplifier, the controls of these potentiometers being ganged together.

3. In a beta ray thickness measuring gauge in accordance with claim 1, a second source of beta rays with a second ionisation chamber, and means for impressing the output from the second chamber on the input of the amplifier, in place of the standard voltage, for normal operation of the gauge.

4. In a beta ray thickness measuring gauge in accordance with claim 3, means for preventing the absorption of the radiation from each source from falling below a value at which the curve connecting chamber output, to a logarithmic base, and mass per unit area of absorber, becomes non-linear.

5. In a beta ray thickness measuring gauge, a first source of beta rays, a first ionisation chamber associated therewith, a second source of beta rays with a second ionisation chamber, a source of standard voltage, an amplifier and a utilisation circuit in the output thereof, means for comparing the outputs from said chambers to produce a difference signal, means for applying said difference signal to the input of said amplifier, means for utilising said difference signal to adjust the output of said second chamber to equalize the outputs from said chambers, means for comparing the output from said first chamber with said standard voltage, and means for jointly varying the standard voltage and the sensitivity of the amplifier to compensate for effects of decay and contamination associated with said first radioactive source.

6. In a beta ray thickness measuring gauge according to claim 5, adapted for measuring the thickness of a coating on a continuous sheet, means for passing the coated sheet between the first ionisation chamber and its radioactive source, and means for passing the sheet, before said coating is applied, between the second ionisation chamber and its radioactive source.

7. In a beta ray thickness measuring gauge in accordance with claim 5, means for preventing the absorption of the radiation from each source from falling below a value at which the curve connecting chamber output, to a logarithmic base, and mass per unit area of absorber, becomes non-linear.

8. A beta ray thickness measuring gauge in accordance with claim 5 wherein the means for utilising said difference signal to adjust the output of the second chamber comprises means for adjusting the distance between the said second radioactive source and the second chamber.

9. A beta ray thickness measuring gauge in accordance with claim 5, wherein the means for jointly varying the standard voltage and the sensitivity of the amplifier comprises electromechanical means operating in dependence on the output of the amplifier.

10. In a beta ray thickness measuring gauge in accordance with claim 8, switching means whereby in one position of the switch contacts the output from said amplifier is adapted to effect said joint variation whereas when said contacts are in an alternative position said amplifier output is utilised to effect said distance adjustment.

11. In a beta ray thickness measuring gauge in accordance with claim 9, switching means whereby in one position of the switch contacts the output from said amplifier is adapted to effect said joint variation whereas when said contacts are in an alternative position said amplifier output is utilised to effect said adjustment of the output from said second ionisation chamber.

12. In a beta ray thickness measuring gauge in accordance with claim 1, a permanent absorber of beta rays from said beta ray source, said permanent absorber being mounted between said beta ray source and said ionisation chamber and having a predetermined minimum value of mass per unit area sufficient to prevent the absorption of beta rays by said permanent absorber from falling below a value at which a curve showing ionisation chamber output current plotted to a logarithmic base as ordinates against mass per unit area of absorber as abscissae becomes non-linear.

13. In a beta ray thickness measuring gauge in accordance with claim 2, a permanent absorber of beta rays from said beta ray source, said permanent absorber being mounted between said beta ray source and said ionisation chamber and having a predetermined minimum value of mass per unit area sufficient to prevent the absorption of beta rays by said permanent absorber from falling below a value at which a curve showing ionisation chamber output current plotted to a logarithmic base as ordinates against mass per unit area of absorber as abscissae becomes non-linear.

References Cited in the file of this patent

UNITED STATES PATENTS

| 2,264,725 | Shoupp et al. | Dec. 2, 1941 |
| --- | --- | --- |
| 2,467,812 | Clapp | Apr. 19, 1949 |
| 2,488,269 | Clapp | Nov. 15, 1949 |
| 2,723,350 | Clapp | Nov. 8, 1955 |
| 2,829,268 | Chope | Apr. 1, 1958 |